(12) United States Patent
Cao et al.

(10) Patent No.: US 10,623,225 B2
(45) Date of Patent: Apr. 14, 2020

(54) RADIO TRANSMITTER AND RECEIVER DEVICES PROCESSING SIGNAL WAVEFORMS WITH SELECTED PULSE SHAPING SCHEME

(71) Applicant: Huawei Technologies Co., Ltd., Shenzhen, Guangdong, P.R. (CN)

(72) Inventors: Hanwen Cao, Munich (DE); Ali Ramadan Ali, Munich (DE); Zhao Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/361,626

(22) Filed: Mar. 22, 2019

(65) Prior Publication Data
US 2019/0222453 A1   Jul. 18, 2019

Related U.S. Application Data

(63) Continuation of application No. PCT/EP2016/072752, filed on Sep. 23, 2016.

(51) Int. Cl.
*H04L 27/26* (2006.01)

(52) U.S. Cl.
CPC ...... *H04L 27/2627* (2013.01); *H04L 27/2646* (2013.01); *H04L 27/2649* (2013.01)

(58) Field of Classification Search
CPC ............. H04L 27/2627; H04L 27/2646; H04L 27/2649
USPC ........................................................ 375/295
See application file for complete search history.

(56) References Cited

U.S. PATENT DOCUMENTS

| | | | |
|---|---|---|---|
| 8,160,163 B1 | 4/2012 | Yucek et al. | |
| 2008/0205351 A1 | 8/2008 | Lindoff et al. | |
| 2009/0135171 A1 | 5/2009 | Chen et al. | |
| 2014/0044089 A1* | 2/2014 | Lopez | H04B 7/0452 370/330 |

(Continued)

FOREIGN PATENT DOCUMENTS

| | | |
|---|---|---|
| CN | 101083649 A | 4/2010 |
| CN | 102263766 A | 11/2011 |

(Continued)

OTHER PUBLICATIONS

Furhwerk, Martin, et. al., "Channel Adaptive Pulse Shaping for OQAM-OFDM Systems", XP032681797, 22nd European Signal Processing Conference (EUSIPCO), Sep. 1-5, 2014, pp. 181-185.

(Continued)

*Primary Examiner* — Michael R Neff
(74) *Attorney, Agent, or Firm* — Slater Matsil, LLP

(57) ABSTRACT

The disclosure relates to a radio transmitter device (and method) comprising a processor configured to: modulate a data frame onto a radio resource based on a transmission waveform, wherein the transmission waveform is formed according to a pulse shaping scheme; allocate a section of the radio resource for carrying information of the pulse shaping scheme; and transmit a signal waveform with selected pulse shaping scheme over the radio resource, wherein the signal waveform includes the information of the pulse shaping scheme and this information is sent over the allocated section of the radio resource. The disclosure further relates to a radio receiver device receiving such signal waveform.

19 Claims, 10 Drawing Sheets

(56) References Cited

U.S. PATENT DOCUMENTS

2015/0103809 A1    4/2015  Karimi et al.

FOREIGN PATENT DOCUMENTS

| CN | 105227502 A | 1/2016 |
|---|---|---|
| WO | 2014121847 A1 | 8/2014 |

OTHER PUBLICATIONS

ZTE, "Discussion on New Waveform for new radio interface", 3GPP TSG RAN WG1 Meeting #84bis, R1-162225, XP051079525, Busan, Korea, Apr. 11-15, 2018, 10 pages.

Bouzegzi, Abdelaziz, et al., "New algorithms for blind recognition of OFDM based systems", Signal Processing 90, Mar. 2010, pp. 900-913.

Guibene, Wael, et al., "Signal Classification in Heterogeneous OFDM-based Cognitive Radio Systems", 20th International Conference on Telecommunications (ICT), May 6-8, 2013, 5 pages.

Yucek, Tevfik, et al., "OFDM Signal Identification and Transmission Parameter Estimation for Cognitive Radio Applications", IEEE GLOBECOM Telecommunications Conference, Nov. 26-30, 2007, 5 pages.

Socheleau, Francois-Xavier, et al., "OFDM System Identification for Cognitive Radio Based on Pilot-Induced Cyclostationarity", IEEE Wireless Communications and Networking Conference, Apr. 5-8, 2009, 6 pages.

3GPP TS 36.213 V13.2.0 (Jun. 2016), 3rd Generation Partnership Project; Technical Specification Group Radio Access Network; Evolved Universal Terrestrial Radio Access (E-UTRA); Physical layer procedures (Release 13), Jun. 2016, 381 pages.

Ericsson, "5G—key component of the Networked Society", RWS-150009, 3GPP RAN Workshop on 5G, Phoenix, AZ, USA, Sep. 17-18, 2015, 55 pages.

* cited by examiner

RADIO TRANSMITTER AND RECEIVER DEVICES PROCESSING SIGNAL WAVEFORMS WITH SELECTED PULSE SHAPING SCHEME

CROSS-REFERENCE TO RELATED APPLICATIONS

This application is a continuation of International Application No. PCT/EP2016/072752 filed on Sep. 23, 2016, the disclosure of which is hereby incorporated by reference in its entirety.

TECHNICAL FIELD

The present disclosure relates to a radio transmitter device transmitting a signal waveform with selected pulse shaping scheme over a radio resource and a radio receiver device receiving such a signal waveform. The disclosure further relates to self-contained pulse-shaping parameter signaling and recognition methods and devices. In particular, the disclosure relates to new waveform schemes for the 5G air interface.

BACKGROUND

The waveform modulation schemes of the air interfaces of the 2G and 3G mobile communication systems use fixed parameters. For example, the 2G GSM (Global System for Mobile communication) system uses signal-carrier GMSK (Gaussian Minimum Shift Keying) modulation with fixed Gaussian filter. The 3G WCDMA (Wideband Code Modulation Multiple Access) system uses single-carrier QAM (Quadrature Amplitude Modulation) modulation with fixed Root-Raised Cosine (RRC) filter. The 4G LTE (Long Term Evolution) uses CP-OFDM (Cyclic-Prefix Orthogonal Frequency Division Multiple Access) multi-carrier waveform with fixed sub-carrier spacing and two options of the Cyclic Prefix (CP) lengths. Table 1 gives an overview of currently specified waveform modulation schemes.

TABLE 1

Comparison of the Pulse Shaping Parameters of 2G to 5G waveforms

| | 2G GSM | 3G WCDMA | 4G LTE | 5G |
|---|---|---|---|---|
| TX filter | Fixed, Gaussian | Fixed, RRC filter | Fixed, rectangular window | Various design principle, flexible length of response |
| Oversampling rate of TX filter | Fixed, 1.5 | Fixed, 1.22 | Fixed, 1.07 or 1.25 (adding CP is actually oversampling) | Flexible |
| Subcarrier spacing | Fixed, single carrier | Fixed, single carrier | Fixed, 15 kHz | flexible |

In the on-going research and design of the future 5G mobile communication system, the air interface with highly flexible waveform configurations are being intensively studied for achieving new features, such as: For supporting the diverse and mixed services for machines and human; for adapting diverse channel and multiple access models; for slicing highly efficiently the radio spectrum resource; for composing reconfigurable frame structure, especially for short-latency application; and for achieving physical layer security against eavesdropping.

For providing the air interface with highly flexible waveform configurations, the chosen configuration can be either signaled between transmitter (TX) and receiver (RX), e.g. by using Common Control Channel Signaling, or the receiving unit can apply blind recognition methods to detect the used waveform configuration. However, signaling requires additional resources for the signaling, e.g. an external signaling channel and blind detection requires long observation time and tends to be unreliable, in particular with fading channel and clock imperfection which makes it inapplicable to short frame and practical conditions.

SUMMARY

It is the object of the disclosure to provide a concept for an efficient and/or reliable indication of a waveform configuration between transmitter and receiver, for example for the scenarios described above.

This object is achieved by the features of the independent claims. Further implementation forms are apparent from the dependent claims, the description and the figures.

A basic idea of the disclosure is to use a special part in the resource of the data frame to indicate the waveform configuration. This special part contained in the resource of the data frame carries the data frame's PSP (Pulse-Shaping Parameters) information. This special part, also denoted as PSP Channel (PSPC) is generated at the transmitter side in the data frame within the unified PSP. The PSPC shows different pattern for different PSP configuration of the data frame, which can signal the PSP information to the receiver side and assist the receiver to achieve reliable recognition of PSP which is done before the demodulation and decoding.

A radio device transmits data frame with a waveform which has the dynamically changing Pulse-Shaping Parameters (PSP): Subcarrier spacing; Oversampling rate; and Pulse-shaping filter class. The transmitted data frame utilizes certain range of time and frequency resources. In order to decode the information carried in the data frame, the receiver recognizes the PSP of the data frame's waveform. The receiver can thus recognize the data frame's PSP purely using the time-frequency resource of the data frame itself without any use of an external signaling channel such as the Common Control Channel (CCC), e.g. the LTE PDCCH, which is outside the time-frequency resource range of the data frame. Hence, the chosen waveform configuration, e.g. PSP, can be signaled within the frame's resource range, for example, in a self-contained manner as described hereinafter.

The disclosure presents a concept for enabling the signaling of the transmitted waveform's variable and adaptive PSP parameters which can be immediately and robustly recognized by the receiver. This allows a reliable recognition of the data frame's dynamic changing PSP without using the resource-costly and inflexible external CCC.

In order to describe the disclosure in detail, the following terms, abbreviations and notations will be used:
PSP: pulse shaping parameters
PSPC: PSC channel
WCDMA: wideband code division multiple access
LTE: long term evolution
OFDM: orthogonal frequency division multiplex
CP-OFDM: cyclic-prefix OFDM
CP: cyclic prefix
RRC: root-raised cosine
GSM: global system for mobile communication 5G: fifth generation (wireless communication network)
PHY: physical device
CCC: common control channel
PDCCH: physical downlink control channel
SC: subcarrier
FBMC: filter bank multi carrier
SC-FDM: single carrier frequency division multiplexing
MCS: modulation and coding scheme
RX: receive
TX: transmit
UE: user equipment, mobile terminal
BS: base station, serving radio cell
QAM: quadrature amplitude modulation
DFT: discrete Fourier transform
ETU: extended typical urban (channel model)
EVA: extended vehicular A (channel model)
PMR: probability of misrecognition
AWGN: additive white Gaussian noise
SNR: signal to noise ratio
ACK: acknowledgement
NACK: not acknowledgement
GP: guard period
MIMO: multiple input multiple output According to a first aspect, the disclosure relates to a radio transmitter device comprising a processor configured to: modulate a data frame onto a radio resource based on a transmission waveform, wherein the transmission waveform is formed according to a pulse shaping scheme; allocate a section of the radio resource for carrying information of the pulse shaping scheme; and transmit a signal waveform with selected pulse shaping scheme over the radio resource, wherein the signal waveform includes the information of the pulse shaping scheme and this information is sent over the allocated section of the radio resource.

Such radio transmitter device is able to enable flexible, efficient and reliable reconfiguration of the signal waveform on the fly, i.e. by changing the pulse shaping parameters from data frame to data frame. The flexible reconfiguration of the Pulse-Shaping Parameters (PSP) can be completely conducted within a single piece of time/frequency resource without the needs for a Common Control Channel (CCC) for signaling the PSP. In this way, the control channel itself can be also generated with dynamically configurable PSP with self-contained signaling for adapting different services and channel conditions. The self-contained signaling of the transmitter device doesn't require any time- and resource-consuming handshake between the transmitter and receiver sides but just minor resource overhead taken by the PSP Channel (PSPC), therefore, no extra time delay is introduced. Comparing with blind detection, the recognition of the PSP is much more robust even with short burst length. The recognition algorithm at receiver side can thus be strongly simplified.

The dynamically variable PSP parameter with self-contained signaling can enhance information security from the physical layer. Apart from the variable modulation/coding method in conventional communication system, additional variability of the transmitted waveform can increase the difficulty of signal interception by an unwanted receiver.

In a first possible implementation form of the radio transmitter device according to the first aspect, the pulse shaping scheme of the transmission waveform is time variable.

This provides the advantage that the pulse shaping scheme can be adapted to a time-varying channel in order to optimize throughput over the varying channel.

In a second possible implementation form of the radio transmitter device according to the first aspect as such or according to the first implementation form of the first aspect, the section carrying the pulse shaping scheme is allocated in changeable part of the radio resource.

This provides the advantage that the section with the pulse shaping scheme can be flexibly accessed to frequency and/or time positions of the radio resource depending on the needs of transmitter device and receiver device.

In a third possible implementation form of the radio transmitter device according to the first aspect as such or according to any of the preceding implementation forms of the first aspect, the radio transmitter device is configured to allocate the section on the basis of the pulse shaping scheme.

This provides the advantage that depending on the pulse shaping scheme different sizes of the radio resource can be allocated resulting in an efficient use of the radio resources.

In a fourth possible implementation form of the radio transmitter device according to the first aspect as such or according to any of the preceding implementation forms of the first aspect, the radio transmitter device is configured to change the allocation of the section between two consecutive frames.

This provides the advantage that the signal waveform can be quickly changed if necessary, allowing fast reaction to changing conditions.

In a fifth possible implementation form of the radio transmitter device according to the first aspect as such or according to any of the preceding implementation forms of the first aspect, the information of the pulse shaping scheme comprises at least one of the following pulse shaping parameters (PSP): a subcarrier spacing, an oversampling rate and a transmitting pulse shaping filter class.

This provides the advantage that the pulse shaping scheme can be efficiently indicated between transmitter device and receiver device by using only a small amount of information characterized by the three parameters: subcarrier spacing, oversampling rate and transmitting pulse shaping filter class.

In a sixth possible implementation form of the radio transmitter device according to the first aspect as such or according to any of the preceding implementation forms of the first aspect, the processor is configured to uniquely map the information of the pulse shaping scheme as a time-frequency-sequence pattern denoting a discrete number of different pulse shaping scheme configurations onto the radio resource.

This provides the advantage that any change in reconfiguring the PSP will result in a change in at least one of the three factors of the PSP pattern.

In a seventh possible implementation form of the radio transmitter device according to the sixth implementation form of the first aspect, each signal configuration comprises a specific signal sequence, a specific subcarrier index and a specific starting time of the time-frequency pattern.

This feature enables the receiver being able to recognize the different PSP by processing the PSP channel, i.e. the allocated section of the radio resource for transporting the PSP pattern, with signal processing methods.

In an eighth possible implementation form of the radio transmitter device according to the seventh implementation form of the first aspect, the specific signal sequence comprises a complex vector, in particular a Zadoff-Chu sequence, a PN sequence or cyclic shifted versions thereof.

This provides the advantage that existing methods for detecting such sequences can be easily implemented in the receiver device in order to detect the PSP configuration.

In a ninth possible implementation form of the radio transmitter device according to the first aspect as such or according to any of the preceding implementation forms of the first aspect, the processor is configured to encrypt the information of the pulse shaping scheme before transmission of the signal waveform.

The dynamically variable PSP parameter with self-contained signaling with encrypted information of the PSP can enhance information security from the physical layer and thus increase the difficulty of signal interception by an unwanted receiver. An encrypted PSP parameter is much more challenging to the signal interception of the unintended receiver (aggressor).

In a tenth possible implementation form of the radio transmitter device according to the first aspect as such or according to any of the preceding implementation forms of the first aspect, the processor is configured to modulate the data frame by using per-subcarrier filtering based transmission waveform or by using per-subband filtering based transmission waveform.

This provides the advantage of a flexible receiver architecture, i.e. different receiver architectures, e.g. based on subcarrier filtering or subband filtering can be implemented.

In an eleventh possible implementation form of the radio transmitter device according to the first aspect as such or according to any of the preceding implementation forms of the first aspect, the processor is configured to adapt the transmission waveform based on feedback information, in particular feedback information received from a receiver of the transmitted signal waveform, wherein the feedback information is derived from channel state information.

This provides the advantage that the transmission waveform can be precisely designed when exploiting feedback information from the receiver, in particular channel state information.

In a twelfth possible implementation form of the radio transmitter device according to the first aspect as such or according to any of the preceding implementation forms of the first aspect, the data frame is a self-contained data frame which comprises a first section including transmit data, a second section including the information of the pulse shaping scheme, and a third section comprising feedback information indicating a pulse shaping scheme for a next transmission.

This provides the advantage that all required information such as PSP and feedback information can be efficiently transported by the self-contained data frame.

According to a second aspect, the disclosure relates to a radio receiver device, comprising a processor configured to: receive a signal waveform with selected pulse shaping scheme transmitted over a radio resource, wherein the signal waveform includes information of the pulse shaping scheme; detect the information of the pulse shaping scheme from the radio resource; and demodulate the signal waveform from the radio resource by using a reception PSP formed according to the detected information of the pulse shaping scheme.

Such radio receiver device is able to apply flexible, efficient and reliable reconfiguration of the signal waveform on the fly, i.e. by changing the pulse shaping parameters from data frame to data frame. The flexible reconfiguration of the Pulse-Shaping Parameters (PSP) can be completely conducted within a single piece of time/frequency resource without the needs for a Common Control Channel (CCC) for signaling the PSP. In this way, the control channel itself can be also generated with dynamically configurable PSP with self-contained signaling for adapting different services and channel conditions. The self-contained signaling doesn't require any time- and resource-consuming handshake between the transmitter and receiver sides but just minor resource overhead taken by the PSP Channel (PSPC), therefore, no extra time delay is introduced. Comparing with blind detection, the recognition of the PSP is much more robust even with short burst length. The recognition algorithm at receiver side can thus be strongly simplified.

In a first possible implementation form of the radio receiver device according to the second aspect, the information of the pulse shaping scheme comprises at least one of the following pulse shaping parameters (PSP): a subcarrier spacing, an oversampling rate and a transmitting pulse shaping filter class.

This provides the advantage that the pulse shaping scheme can be efficiently indicated between transmitter device and receiver device by using only a small amount of information characterized by the three parameters: subcarrier spacing, oversampling rate and transmitting pulse shaping filter class.

In a second possible implementation form of the radio receiver device according to the second aspect as such or according to the first implementation form of the second aspect, the information of the pulse shaping scheme is uniquely mapped as a time-frequency-sequence pattern, which denotes a discrete number of different pulse shaping scheme configurations, onto the radio resource.

This provides the advantage that any change in reconfiguring the PSP will result in a change in at least one of the three factors of the PSP pattern.

In a third possible implementation form of the radio receiver device according to the second implementation form of the second aspect, the processor is configured to detect the information of the pulse shaping scheme based on matching the radio resource with all pulse shaping scheme configurations from the discrete number of different pulse shaping scheme configurations.

This provides the advantage that the receiver device can apply signal processing methods such as Discrete Fourier Transform or Pearson correlation processing for detection of the PSP.

According to a third aspect, the disclosure relates to a method for transmitting a signal waveform with selected pulse shaping scheme over a radio resource, the method comprising: modulating a data frame onto a radio resource based on a transmission waveform, wherein the transmission waveform is formed according to a pulse shaping scheme; allocating a section of the radio resource for carrying information of the pulse shaping scheme; and transmitting a signal waveform with selected pulse shaping scheme over the radio resource, wherein the signal waveform includes the information of the pulse shaping scheme and this information is sent over the allocated section of the radio resource.

Such a method can perform flexible, efficient and reliable reconfiguration of the signal waveform on the fly. The flexible reconfiguration of the Pulse-Shaping Parameters (PSP) can be completely conducted within a single piece of time/frequency resource without the needs for a Common Control Channel (CCC) for signaling the PSP.

According to a fourth aspect, the disclosure relates to a method for receiving a signal waveform with selected pulse shaping scheme over a radio resource, the method comprising: receiving a signal waveform with selected pulse shaping scheme transmitted over a radio resource, wherein the signal waveform includes information of the pulse shaping scheme; detecting the information of the pulse shaping scheme from the radio resource; and demodulating the signal waveform from the radio resource by using a reception PSP formed according to the detected information of the pulse shaping scheme.

Such a method can save resources by avoiding the use of a Common Control Channel (CCC) for signaling the PSP. Compared with blind detection, the recognition of the PSP is much more robust even with short burst length. The recognition algorithm at receiver side can thus be strongly simplified.

According to a fifth aspect, the disclosure relates to a computer program being configured to implement the method according to the third aspect or according to the fourth aspect when executed on a computer.

This provides the advantage that such a computer program can be easily implemented on a lot of different radio devices.

BRIEF DESCRIPTION OF THE DRAWINGS

Further embodiments of the disclosure will be described with respect to the following figures, in which.

DETAILED DESCRIPTION

Figure 1:
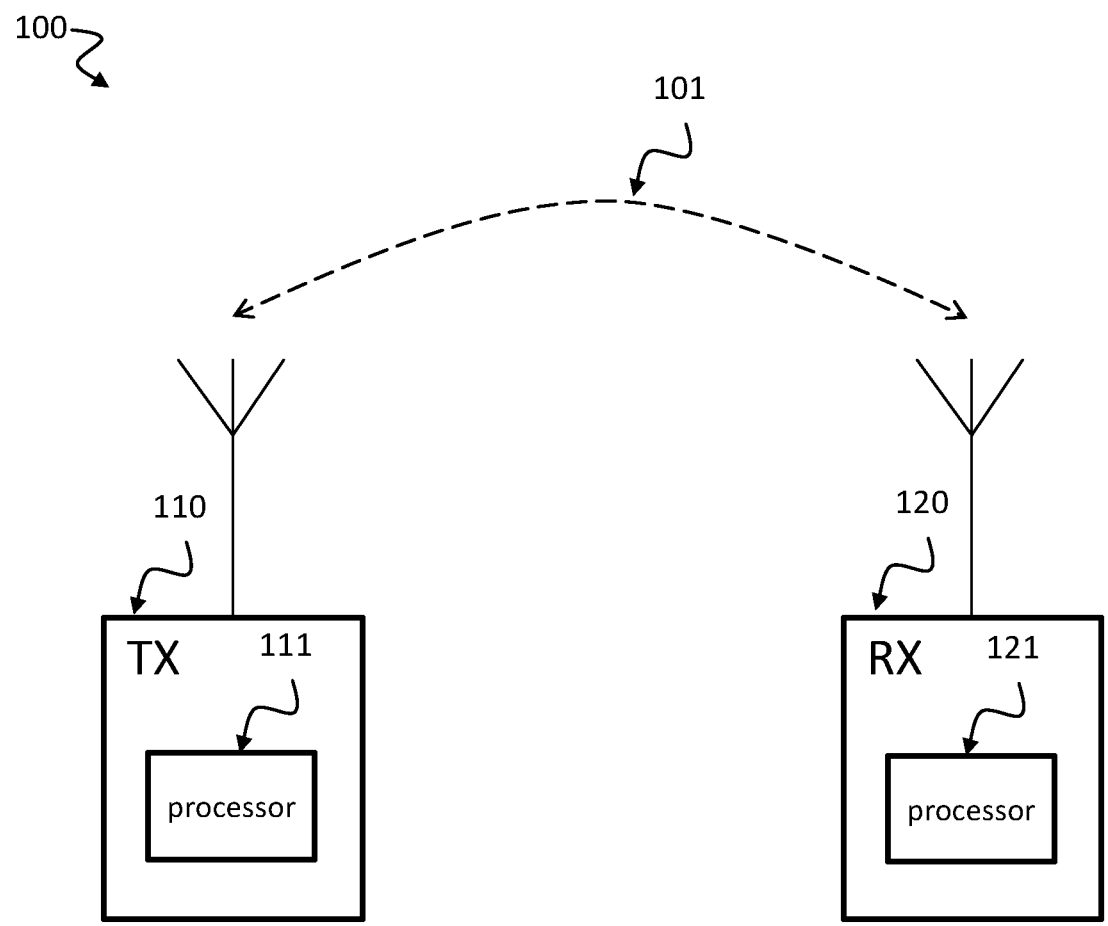
FIG. 1 shows a schematic diagram illustrating a radio communication system 100 with a radio transmitter device 110 and a radio receiver device 120 according to the disclosure.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described device, circuit or system may also hold true for a corresponding method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The devices and methods described herein after may be implemented in wireless communication networks such as e.g. the Long Term Evolution (LTE) standard or the advanced version LTE-A thereof and in particular in 5G networks. LTE (Long Term Evolution), marketed as 4G, is a standard for wireless communication of high-speed data for mobile phones and data terminals. Apart from the even higher data speed, the 5G will further support low-latency, high reliability and massive connections for diverse machine-type services. The methods and devices described below may further be implemented in a radio cell such as a base station (NodeB, eNodeB) or in a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The devices and methods described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

FIG. 1 shows a schematic diagram illustrating a radio communication system 100 with a radio transmitter device 110 and a radio receiver device 120 according to the disclosure. The radio transmitter device 110 communicates with the radio receiver device 120 over a mobile communication channel 101.

The radio transmitter device 110 includes a processor 111. The processor 111 is configured to modulate a data frame onto a radio resource, e.g. a radio resource 300 having time and frequency resources as described below with respect to FIG. 3, based on a transmission waveform. The transmission waveform is formed according to a pulse shaping scheme, e.g. a pulse shaping scheme 310 as described below with respect to FIG. 3. The processor 111 is further configured to allocate a section of the radio resource for carrying information of the pulse shaping scheme, e.g. a section 301 of the time-frequency radio resource 300 shown in FIG. 3. The processor 111 is further configured to transmit a signal waveform with selected pulse shaping scheme over the radio resource, wherein the signal waveform includes the information of the pulse shaping scheme and this information is sent over the allocated section of the radio resource.

The pulse shaping scheme of the transmission waveform may be time variable. The section carrying the pulse shaping scheme may be allocated in a changeable part of the radio resource. The radio transmitter device 110 may allocate the section on the basis of the pulse shaping scheme. The radio transmitter device 110 may be configured to change the allocation of the section between two consecutive frames. The information of the pulse shaping scheme may include at least one of the following pulse shaping parameters (PSP): a subcarrier spacing 201, an oversampling rate 202 and a transmitting pulse shaping filter class 203, e.g. according to the description of FIG. 2. The processor 111 may be configured to uniquely map the information of the pulse shaping scheme as a time-frequency-sequence pattern, e.g. a pattern 307 as shown in FIG. 3, denoting a discrete number of different pulse shaping scheme configurations, e.g. configurations 302, 303, 304 as depicted in FIG. 3, onto the radio resource.

Figure 3:
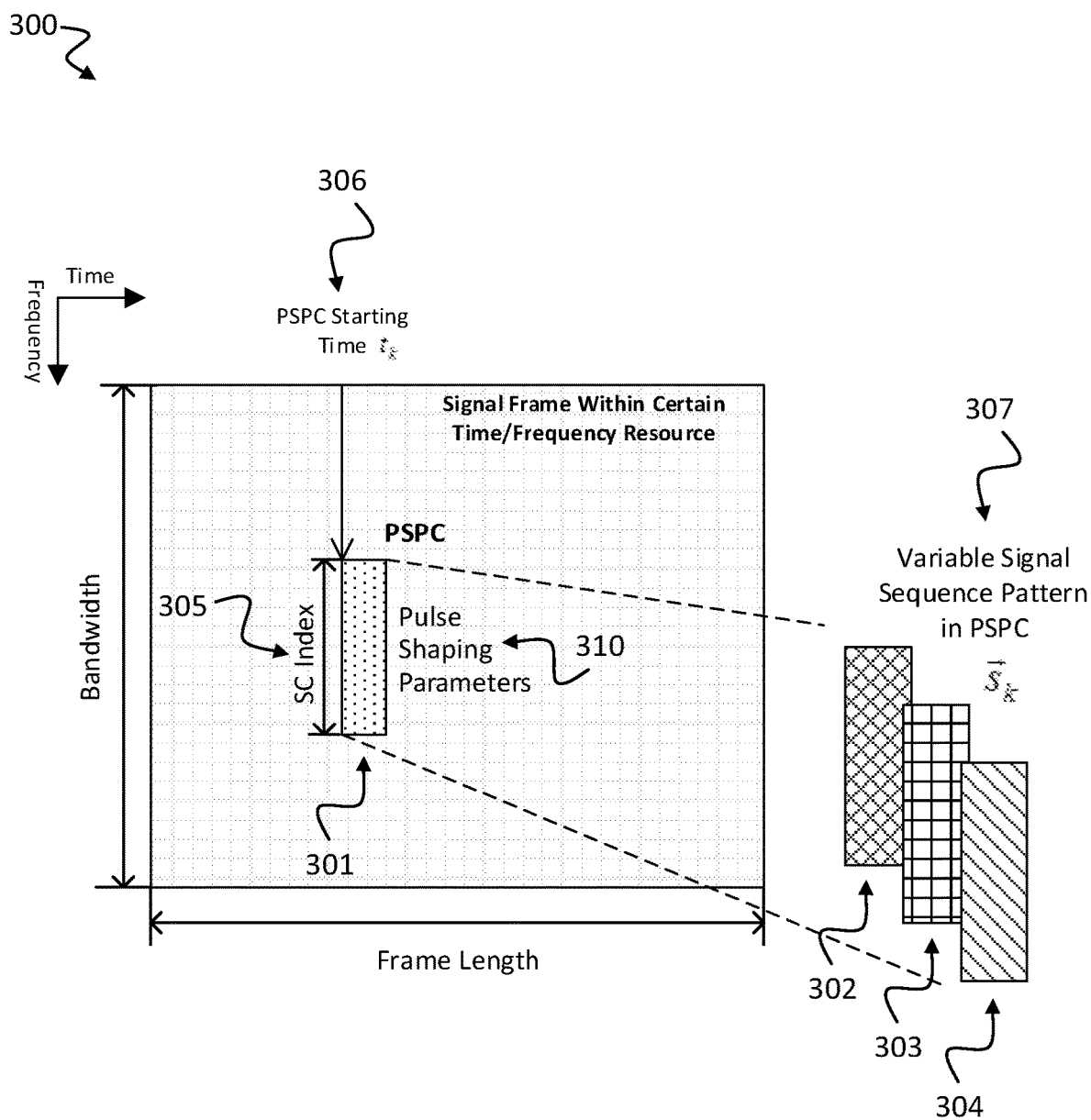
FIG. 3 shows a time-frequency diagram of a resource 300 illustrating the concept of self-contained signaling according to the disclosure.

Each signal configuration may include a specific signal sequence 307, a specific subcarrier index 305 and a specific starting time 306 of the time-frequency pattern, e.g. as illustrated in FIG. 3. The specific signal sequence may include a complex vector, in particular a Zadoff-Chu sequence, a PN (pseudo noise) sequence or cyclic shifted versions thereof.

Figure 5:
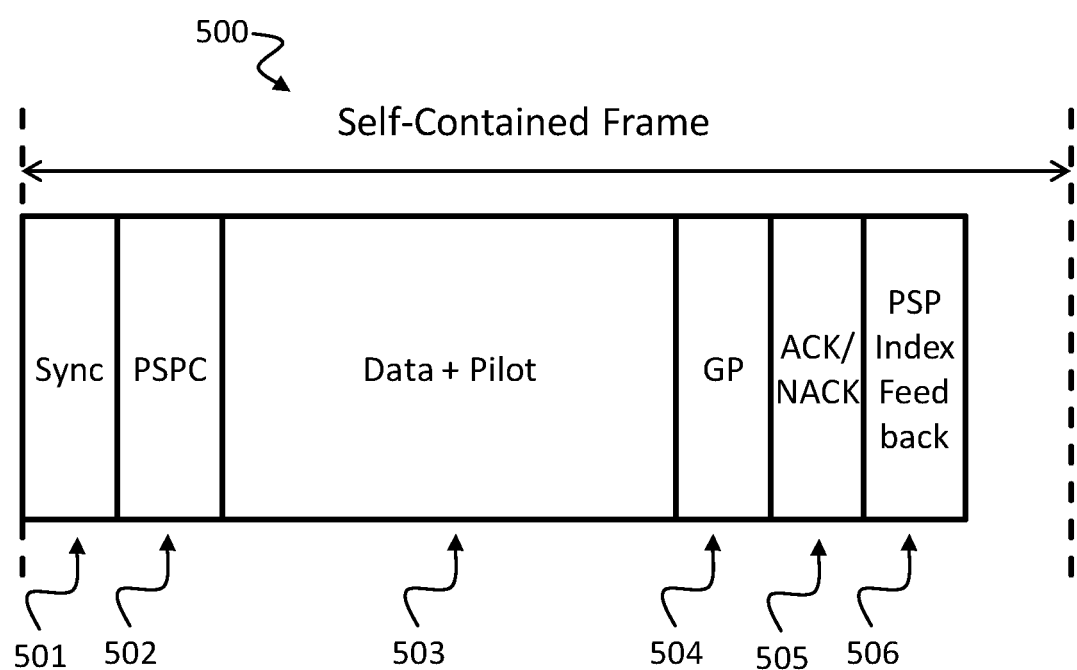
FIG. 5 shows a schematic diagram illustrating an exemplary frame structure of a self-contained frame 500 with feedback of the PSP index 506 according to the disclosure.
Figure 6A:
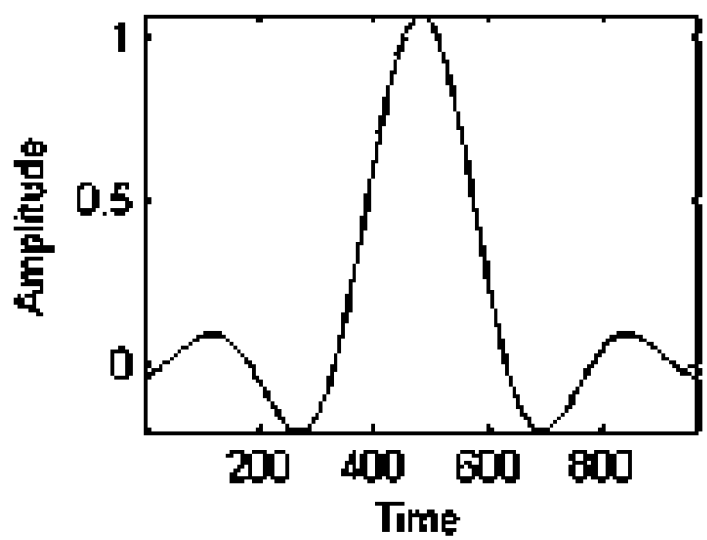
FIG. 6a to 6l show exemplary pulse shaping filter impulse responses of twelve exemplary PSP configurations according to the disclosure.
Figure 6B:
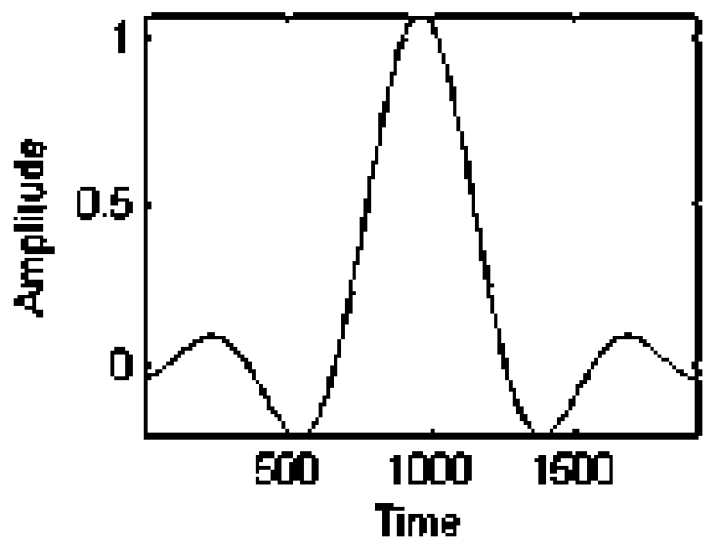
Figure 6C:
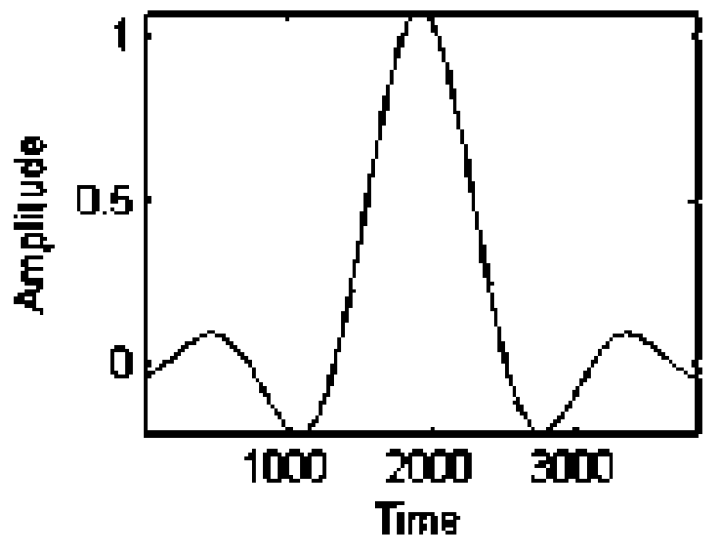
Figure 6D:
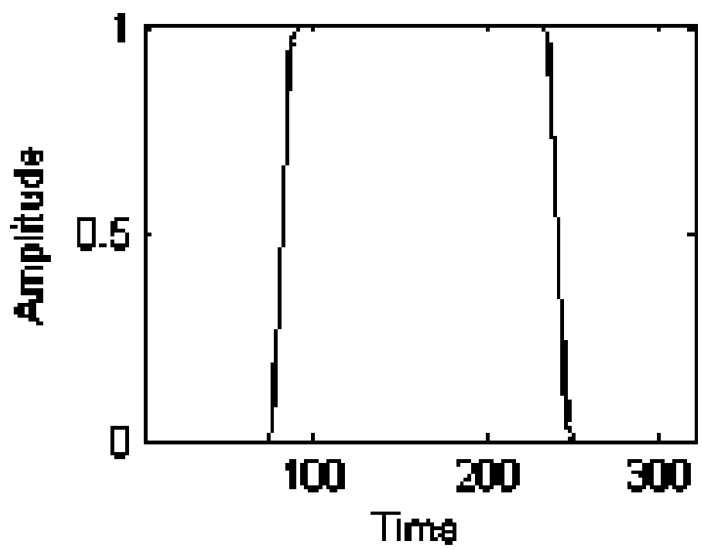
Figure 6E:
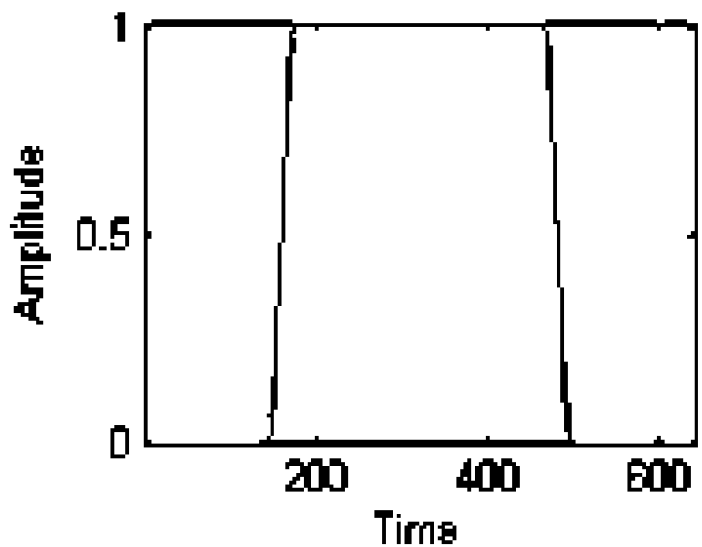
Figure 6F:
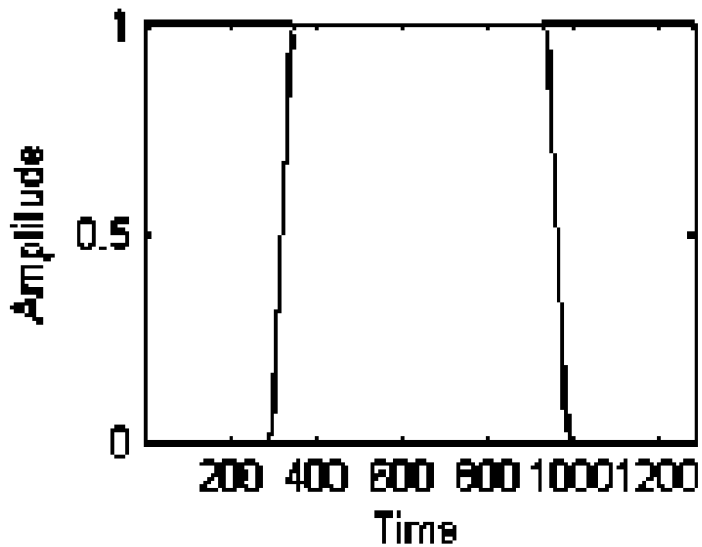
Figure 6G:
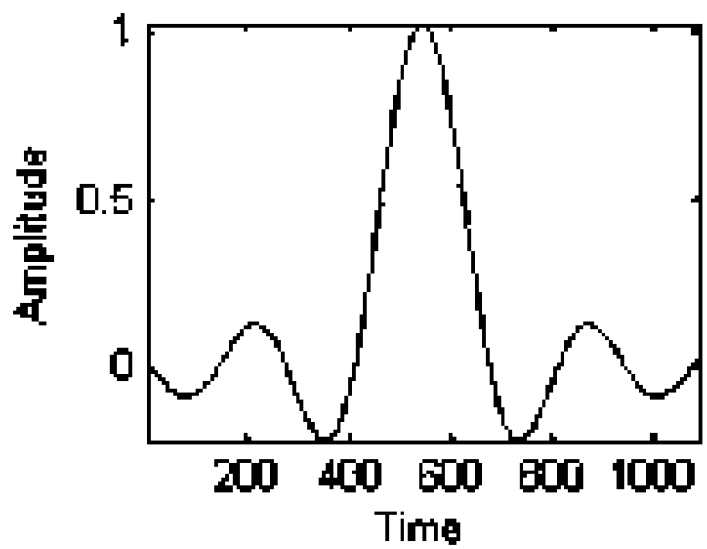
Figure 6H:
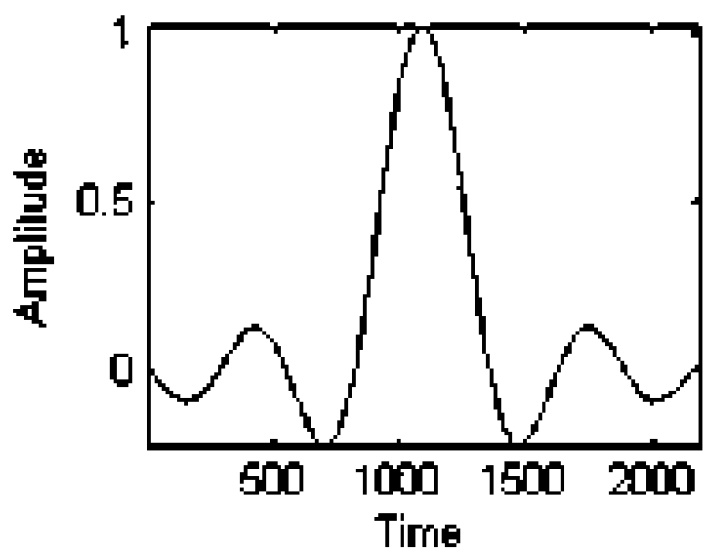
Figure 6I:
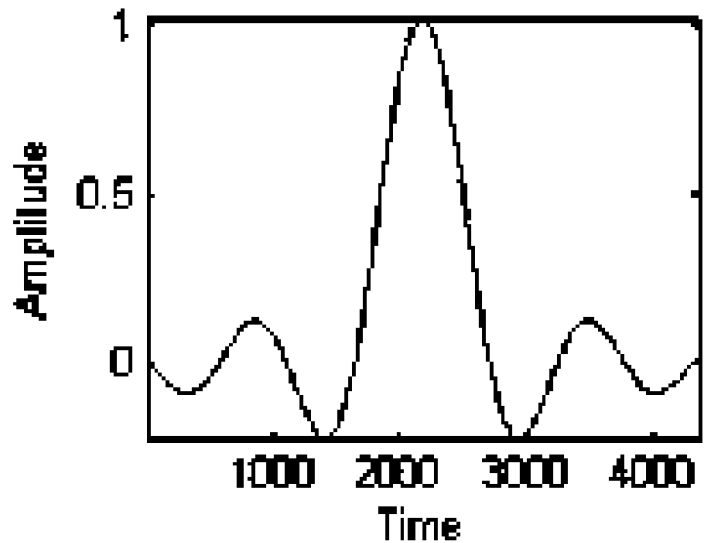
Figure 6J:
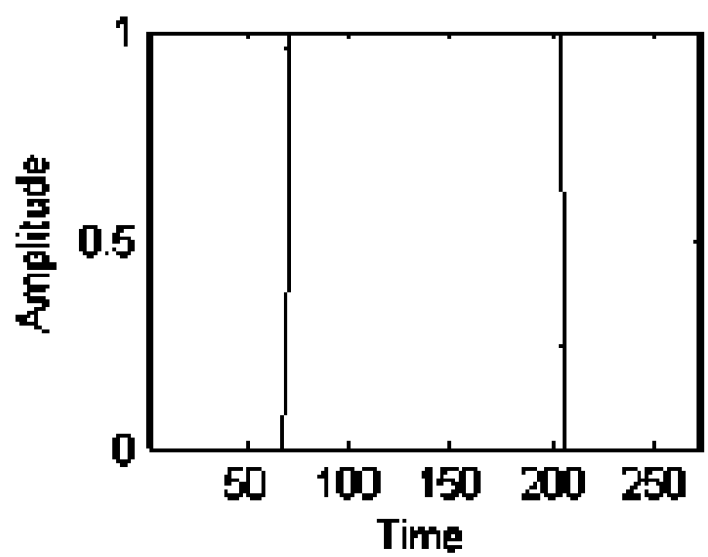
Figure 6K:
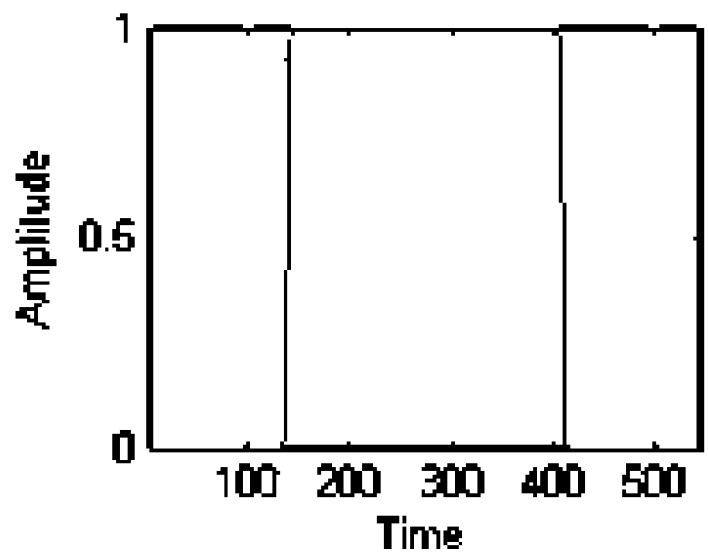
Figure 6L:
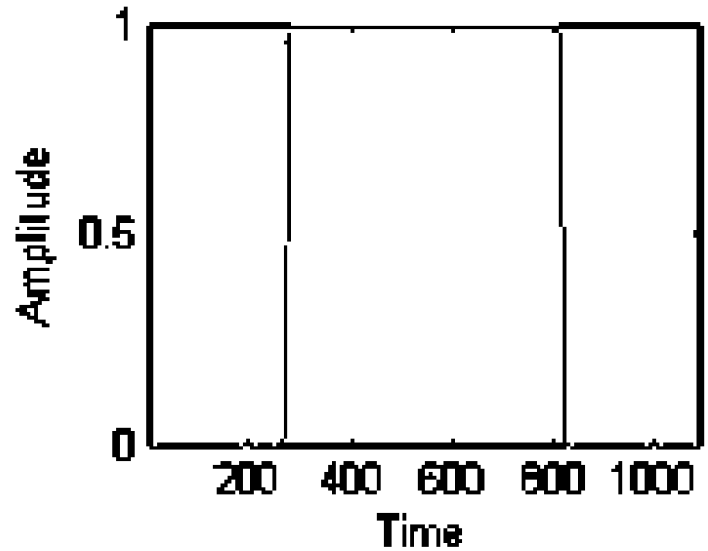

The processor 111 may be configured to encrypt the information of the pulse shaping scheme before transmission of the signal waveform. The processor 111 may be configured to modulate the data frame by using per-subcarrier filtering based transmission waveform or by using per-subband filtering based transmission waveform. The processor 111 may be configured to adapt the transmission waveform based on feedback information, in particular feedback information received from the receiver 120 of the transmitted signal waveform. The feedback information may be derived from channel state information. The data frame may be a self-contained data frame 500, e.g. as described below with respect to FIG. 5. The self-contained data frame may include a first section including transmit data, a second section including the information of the pulse shaping scheme, and a third section comprising feedback information indicating a pulse shaping scheme for a next transmission as shown in FIG. 5.

The radio receiver device 120 includes a processor 121. The processor 121 is configured to receive a signal waveform with selected pulse shaping scheme, e.g. pulse shaping scheme 310 as shown in FIG. 3, transmitted over a radio resource, wherein the signal waveform includes information of the pulse shaping scheme. The processor 121 is further configured to detect the information of the pulse shaping scheme from the radio resource and to demodulate the signal waveform from the radio resource by using a reception PSP formed according to the detected information of the pulse shaping scheme 310.

The information of the pulse shaping scheme may include at least one of the following pulse shaping parameters (PSP): a subcarrier spacing 201, an oversampling rate 202 and a transmitting pulse shaping filter class 203, e.g. as described below with respect to FIG. 2. The information of the pulse shaping scheme may be uniquely mapped as a time-frequency-sequence pattern 307, e.g. as shown in FIG. 3, which denotes a discrete number of different pulse shaping scheme configurations 302, 303, 304, onto the radio resource 300. The processor 121 may be configured to detect the information of the pulse shaping scheme 310 based on matching the radio resource 300 with all pulse shaping scheme configurations 302, 303, 304 from the discrete number of different pulse shaping scheme configurations.

The disclosure also relates to a method for transmitting a signal waveform with selected pulse shaping scheme over a radio resource which can be processed by the processor 111. Such method includes the following blocks: modulating a data frame onto a radio resource based on a transmission waveform, wherein the transmission waveform is formed according to a pulse shaping scheme; allocating a section of the radio resource for carrying information of the pulse shaping scheme; and transmitting a signal waveform with selected pulse shaping scheme over the radio resource, wherein the signal waveform includes the information of the pulse shaping scheme and this information is sent over the allocated section of the radio resource.

The disclosure also relates to a method for receiving a signal waveform with selected pulse shaping scheme over a radio resource. This method can be processed by the processor 121. Such method includes the following blocks: receiving a signal waveform with selected pulse shaping scheme transmitted over a radio resource, wherein the signal waveform includes information of the pulse shaping scheme; detecting the information of the pulse shaping scheme from the radio resource; and demodulating the signal waveform from the radio resource by using a reception PSP formed according to the detected information of the pulse shaping scheme.

The disclosure also relates to a computer program being configured to implement the methods for transmitting or receiving such signal waveform over a radio resource when executed on a computer, e.g. executed by the processor 111 of the transmitter device 110 or by the processor 121 of the receiver device.

Figure 2:
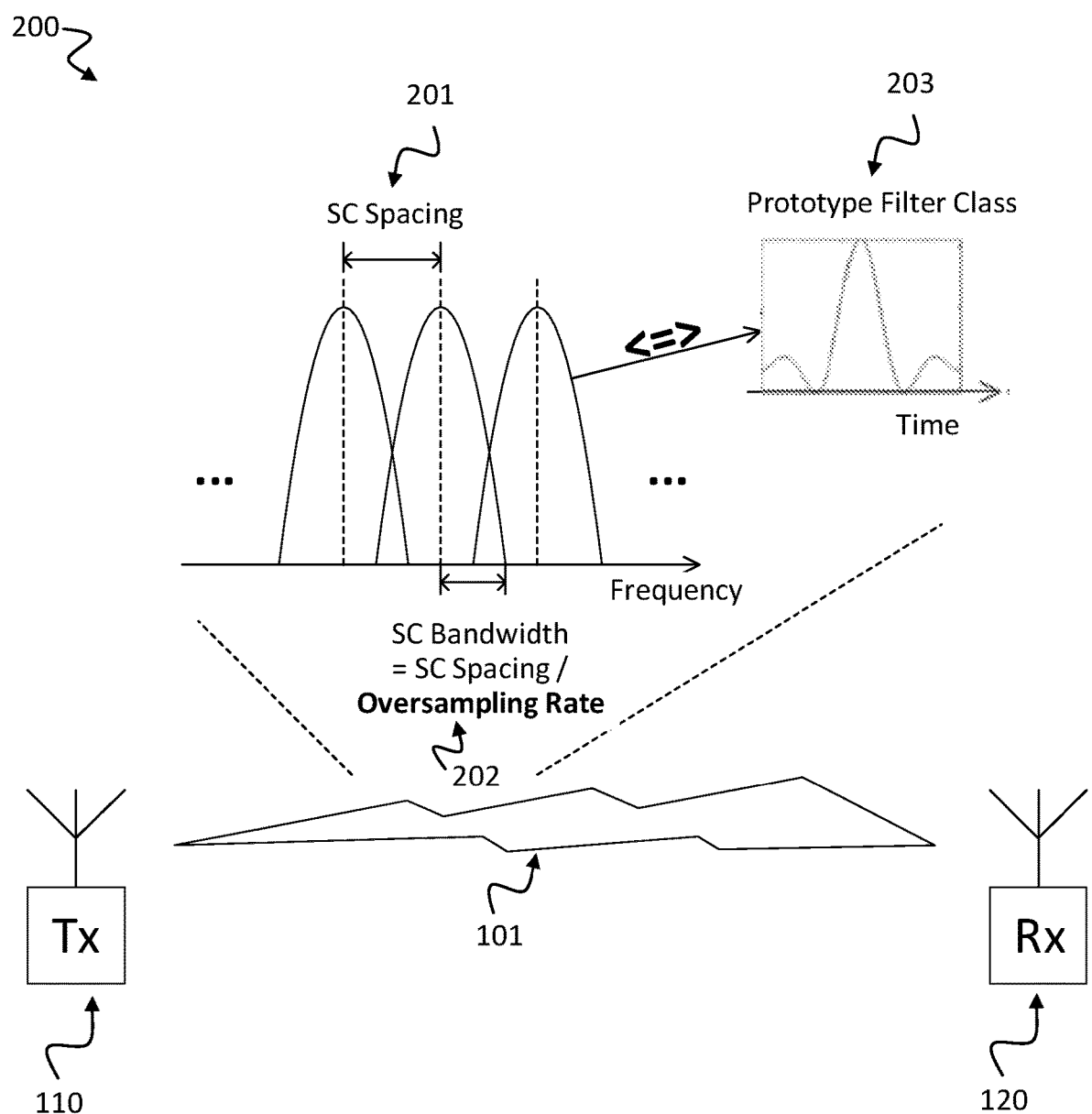
FIG. 2 shows a schematic diagram 200 illustrating flexible Pulse Shaping Parameters (PSP) of the transmitted signal according to the disclosure.

FIG. 2 shows a schematic diagram 200 illustrating flexible Pulse Shaping Parameters (PSP) of the transmitted signal according to the disclosure.

The transmitter 110 transmits the signal to the receiver 120 side, with the flexible wave in which the following Pulse-Shaping Parameters (PSP) can be dynamically changed: Subcarrier spacing 201; Oversampling rate 202; and Pulse-shaping (or prototype) filter class 203. As is illustrated in FIG. 2, the Subcarrier (SC) spacing 201 is the distance between the adjacent subcarriers center frequencies. The signal on each SC is filtered in time domain with certain class of pulse-shaping filter 203 in order to suppress the power interference leakage to other SCs while maintaining orthogonality with minimized inter-SC and inter-symbol interferences. The oversampling rate 202 equals to the SC spacing 201 divided by the main lobe bandwidth of the signal on a SC which equals to the symbol rate of the signal on a SC.

FIG. 3 shows a time-frequency diagram of a resource 300 illustrating the concept of self-contained signaling according to the disclosure.

The key idea of signaling the PSP 310 is that a special part 301 contained in the resource 300 of the data frame carries the data frame's PSP information 310. This special part 301, named PSP Channel (PSPC) is generated at the transmitter 110 side in the data frame within the unified PSP. The PSPC 301 shows different pattern 302, 303, 304 for different PSP configuration of the data frame, which can signal the PSP information 310 to the receiver 120 side and assist the receiver 120 to achieve reliable recognition of PSP 310 which is done before the demodulation and decoding.

FIG. 3 presents this self-contained signaling concept that within a deterministic time-frequency resource 300 used by a data frame, the PSPC 301 is contained, whose Starting Time 306, SC Index 305 and the Signal Sequence Pattern 307 are illustrated.

In a multi-carrier modulation scheme (e.g. OFDM, FBMC) or a single-carrier modulation scheme implemented with the multi-carrier method (e.g. SC-FDM), the PSPC's starting time 306 is corresponding to the index of the multi-carrier symbol in which the PSPC signal sequence 307 is contained. The PSPC signal sequence 307 can be any complex vector (e.g. Zadoff-Chu sequence, PN sequence) which is mapped into the multi-carrier symbol on the specified SC indices 305.

In one implementation form, security can be enhanced via dynamically reconfigurable PSP 310 with secret PSPC pattern 307. The transmitted waveform can be made much more variable by dynamically changing its PSP 310. The PSPC 301 can be encrypted that it is only known by the intended receiver 120. Without the knowledge of the PSP 310, it becomes much more difficult for the unintended receiver to eavesdrop and decode the signal. Thereby further enhancement in information security can be achieved.

Figure 4:
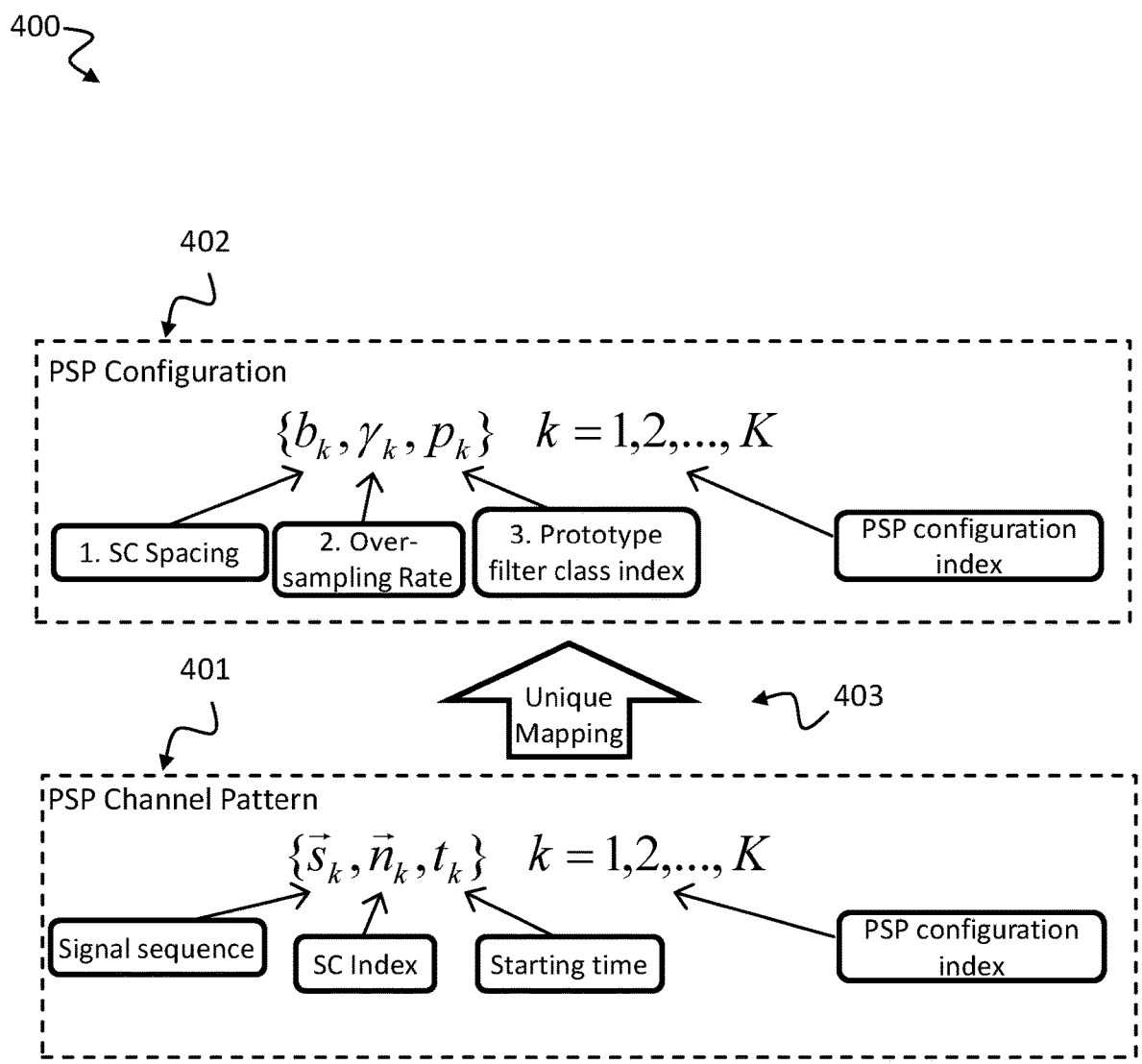
FIG. 4 shows a schematic diagram 400 illustrating mapping of PSP configuration 401 to PSP channel pattern 402 according to the disclosure.

FIG. 4 shows a schematic diagram 400 illustrating mapping of PSP configuration 401 to PSP channel pattern 402 according to the disclosure.

As is shown in FIG. 4, the PSPC channel pattern 401 including parameters {Starting Time $t_k$, SC Index $\vec{n}_k$, Signal Sequence $\vec{s}_k$} is uniquely mapped 403 to the PSP configuration 402 including parameters {SC spacing $b_k$, oversampling rate $\gamma_k$, pulse shaping filter class $p_k$, also denoted as prototype filter class index}. Thus, any change in reconfiguring the PSP 402 will result in a change in at least one of the three factors of the PSPC pattern 401. This key feature of the PSPC enables the receiver 120 being able to recognize the different PSP by processing the PSPC with signal processing method.

An example for recognizing the different PSP, e.g. implemented in a receiver device 120 as shown in FIG. 1, is described in the following: Assume y(t) is the received and synchronized time domain signal sample series which is generated with PSP configuration index c. The way of recognizing the PSP used in the transmitted signal is to find out c by testing different PSP denotation:

$$[\vec{s}_k, \vec{n}_k, t_k] \; k=1, 2, \ldots, K$$

Based on the assumed starting time $t_k$ of PSPC, the receiver chooses the PSPC signal sequence vector which may be possibly contained in the transmitted data frame:

$$\vec{y}_k = [y(t_k), y(t_k+1), \ldots, y(t_k+M_k-1)]^T$$

Then, the receiver coarsely (e.g. simply using the DFT operation) demodulates the signal into SC vectors and takes out the possible SCs used by the assumed PSPC:

$$\vec{z}_k = \text{Demod}(\vec{y}_k)\vec{z}_k(\vec{n}_k) = [z_k(n_k(1)), z_k(n_k(2)), \ldots, z_k(n_k(N_k))]^T.$$

The next step is to find the PSPC pattern with the most similarity to the received one, which can be performed, for example, by calculating the Pearson product-moment correlation coefficient between the assumed pattern sequence and the demodulated received signal at assumed starting time:

$$\delta(k, y(t)) = \frac{|\vec{z}_k(\vec{n}_k)^H \vec{s}_k|}{\|\vec{z}_k(\vec{n}_k)\| \cdot \|\vec{s}_k\|}.$$

The recognition can be finally achieved by finding the PSPC pattern with the maximum similarity:

$$\hat{c} = \arg\max_k \{\delta(k, y(t))\}.$$

FIG. 5 shows a schematic diagram illustrating an exemplary frame structure of a self-contained frame 500 with feedback of the PSP index 506 according to the disclosure.

The self-contained frame 500 includes a synchronization section 501, a PSPC section including the PSPC 301 as described above with respect to FIG. 3, a data and pilot section 503 including data and pilot signal, a guard period (GP) section 504, an ACK/NACK section 505 for acknowledgement or non-Acknowledgement and a PSP Index Feedback section 506.

In order to configure the PSP of the transmitted signal in order to adapt the changing wireless channel, the transmitter 110 needs the feedback information from the receiver 120, since only the receiver 120 can obtain the knowledge of the channel by processing its received signal. Feedback of the channel information (e.g. delay spread, Doppler frequency) would take too much signaling overhead. Instead, the receiver 120 can simply feedback the index of suggested PSP 506 for the next transmission based on the channel information obtained by processing the currently received frame.

FIGS. 6a to 6l show exemplary pulse shaping filter impulse responses of twelve exemplary PSP configurations according to the disclosure.

In order to prove the feasibility and effectiveness of the disclosed scheme of self-contained PSP signaling, computer simulations have been conducted with FBMC/QAM Modulation and a sampling rate of 1.92 MS/s. The twelve different PSP configurations with 3 options of SC spacing: 15 kHz, 7.5 kHz, 3.75 kHz=>DFT size: 128(80), 256(160), 512 (320); 2 options of oversampling (OS) rate: 5/4, 17/16 and 2 options of prototype filter classes: Root Raised Cosine (RRC) and Windowing are listed in Table 2 below. The PSP signal is a Zadoff-Chu sequence (index 7, length 60) and its cyclically shifted version. The PSP Channel has the starting time located at the 4th multi-carrier symbol in the frame.

The in total 12 dynamic PSP configurations with different SC spacings, oversampling rates and pulse-shaping filter classes are presented in Table 2. Besides, the FIGS. 6a to 6l show the diverse pulse-shaping filter's impulse responses of the 12 PSP configurations.

TABLE 2

The 12 Dynamic PSP configurations in the simulation study

| | Over Sampling: 5/4 | | Over Sampling: 17/16 | |
|---|---|---|---|---|
| | RRC | Window | RRC. | Window |
| SC: 15 kHz DFT: 128 | Config 1: Seq.: ZC_7_60 SC idx: [25~84] Start: 480 | Config 4: Seq.: ZC_7_60 (cyc. shifted) SC idx: [25~84] Start: 480 | Config 7: Seq.: ZC_7_60 SC idx: [25~84] Start: 408 | Config 10: Seq.: ZC_7_60 (cyc. shifted) SC idx: [25~84] Start: 408 |
| SC: 7.5 kHz DFT: 256 | Config 2: Seq.: ZC_7_60 SC idx: [49~108] Start: 960 | Config 5: Seq.: ZC_7_60 (cyc. shifted) SC idx: [49~108] Start: 960 | Config 8: Seq.: ZC_7_60 SC idx: [49~108] Start: 816 | Config 11: Seq.: ZC_7_60 (cyc. shifted) SC idx: [49~108] Start: 816 |
| SC: 3.75 kHz DFT: 512 | Config 3: Seq.: ZC_7_60 SC idx: [49~108] Start: 1920 | Config 6: Seq.: ZC_7_60 (cyc. shifted) SC idx: [49~108] Start: 1920 | Config 9: Seq.: ZC_7_60 SC idx: [49~108] Start: 1632 | Config 12: Seq.: ZC_7_60 (cyc. shifted) SC idx: [49~108] Start: 1632 |

FIGS. 6a, 6b, 6c, 6d, 6e, 6f, 6g, 6h, 6i, 6j, 6k, 6l illustrate the pulse shaping filters impulse responses of configurations 1, 2, 3, 4, 5, 6, 7, 8, 9, 10, 11, 12, respectively. Results of the simulation are illustrated in FIG. 7.

Figure 7:
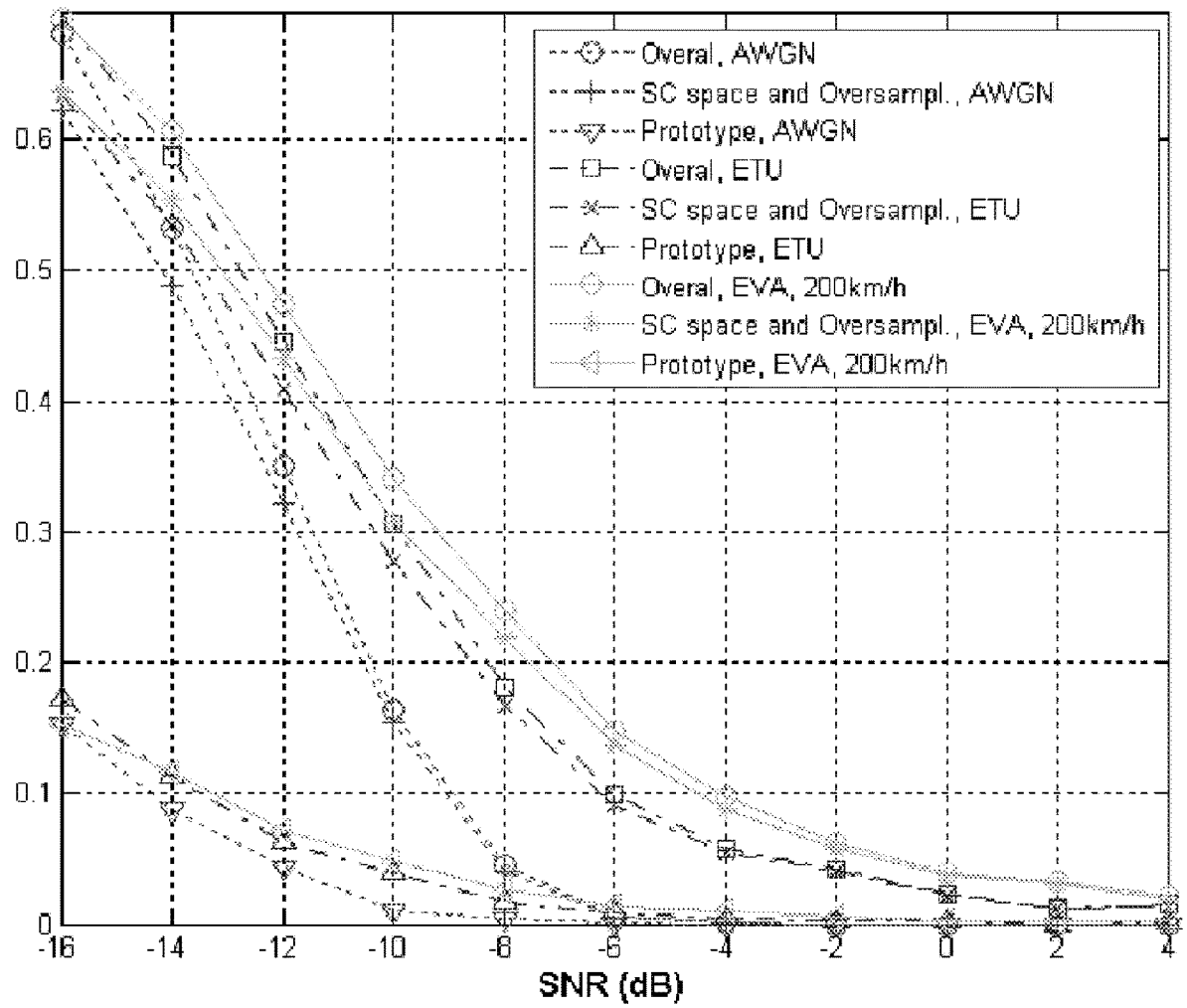
FIG. 7 shows a performance diagram illustrating probability of misrecognition (PMR) via SNR for different channel conditions.

FIG. 7 shows a performance diagram illustrating probability of misrecognition (PMR) via SNR for different channel conditions.

In the simulation, the transmitted waveform is dynamically reconfigured randomly taking one of the twelve PSP configurations as shown above in Table 2. The receiver 120 may recognize the PSP of the transmitted frame by finding the maximum Pearson correlation value of the PSPC pattern, e.g. as described above with respect to FIG. 4. Several channel conditions are simulated, these are Additive White Gaussian Noise model (AWGN), Extended Typical Urban model (ETU) and Extended Vehicular A model (EVA). The simulation results in FIG. 7 show that low Probability of Miss-Recognition (PMR) can be achieved in different channel conditions at low SNR level, which proves the feasibility and the high reliability of the disclosed self-contained PSP signaling scheme.

The disclosed scheme is able to enable the flexible reconfiguration of subcarrier parameters on the fly. The flexible reconfiguration of the Pulse-Shaping Parameters (PSP) can be completely conducted within a single piece of time/frequency resource without the needs for a Common Control Channel (CCC) for signaling the PSP. In this way, the control channel itself can be also generated with dynamically configurable PSP with self-contained signaling for adapting different services and channel conditions.

The self-contained signaling doesn't require any time- and resource-consuming handshake between the transmitter and receiver sides but just minor resource overhead taken by the PSP Channel (PSPC), therefore, no extra time delay is introduced.

Comparing with blind detection, the recognition of the PSP (subcarrier spacing, oversampling rate and prototype filter class) is much more robust even with short burst length. Besides, the recognition algorithm at receiver can be greatly simplified. The receiver algorithm presented above with respect to FIG. 4 and its simulated performances presented in FIG. 7 have proved the effectiveness even with a recognition algorithm with low-complexity.

The dynamically variable PSP parameter with self-contained signaling method can enhance information security from the physical layer. Apart from the variable modulation/coding method in conventional communication system, additional variability of the transmitted waveform can increase the difficulty of signal interception by an unwanted receiver. Besides, the PSPC's pattern can be made secret to an unintended receiver making the signal interception much more challenging.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A radio transmitter device comprising:
a processor configured to:
modulate a data frame onto a radio resource based on a transmission waveform, wherein the transmission waveform is formed according to a pulse shaping scheme, and the pulse shaping scheme comprises that a plurality of pulse shaping parameters are dynamically varied, and the plurality of pulse shaping parameters comprises a subcarrier spacing, an oversampling rate and a transmitting pulse shaping filter class;
allocate a section of the radio resource for carrying information of the pulse shaping scheme, wherein the information of the pulse shaping scheme comprises information of a currently used subcarrier spacing, a currently used oversampling rate, and a currently used transmitting pulse shaping filter class; and
transmit a signal waveform according to the pulse shaping scheme over the radio resource, wherein the signal waveform comprises the information of the pulse shaping scheme within the allocated section of the radio resource.

2. The radio transmitter device of claim 1, wherein the section carrying the pulse shaping scheme is allocated in a changeable part of the radio resource.

3. The radio transmitter device of claim 1, wherein the processor is configured to:
allocate the section based on the pulse shaping scheme.

4. The radio transmitter device of claim 1, wherein the processor is configured to:
change the allocation of the section between two consecutive frames.

5. The radio transmitter device of claim 1, wherein the processor is configured to:
uniquely map the information of the pulse shaping scheme as a time-frequency-sequence pattern denoting one of a plurality of different pulse shaping scheme configurations onto the radio resource.

6. The radio transmitter device of claim 5, wherein each of the plurality of pulse shaping configurations comprises a specific signal sequence, a specific subcarrier index and a specific starting time of the time-frequency-sequence pattern.

7. The radio transmitter device of claim 6, wherein the specific signal sequence comprises a complex vector comprising at least one of: a Zadoff-Chu sequence, a PN sequence and a cyclic shifted version of a Zadoff-Chu sequence or a PN sequence.

8. The radio transmitter device of claim 1, wherein the processor is configured to:
    encrypt the information of the pulse shaping scheme before transmission of the signal waveform.

9. The radio transmitter device of claim 1, wherein the processor is configured to:
    modulate the data frame by using per-subcarrier filtering based transmission waveform or by using per-subband filtering based transmission waveform.

10. The radio transmitter device of claim 1, wherein the processor is configured to:
    adapt the transmission waveform based on feedback information received from a receiver of the transmitted signal waveform.

11. The radio transmitter device of claim 1, wherein the data frame is a self-contained data frame comprising:
    a first section including transmit data, a second section including the information of the pulse shaping scheme, and a third section comprising feedback information indicating a pulse shaping scheme for a next transmission.

12. A radio receiver device, comprising:
    a processor configured to:
        receive a signal waveform with a selected pulse shaping scheme transmitted over a radio resource, wherein the signal waveform comprises a section of the radio resource that carries information of the selected pulse shaping scheme, and wherein the information of the selected pulse shaping scheme comprises information of a plurality of pulse shaping parameters corresponding to the signal waveform, and the plurality of pulse shaping parameters comprises a subcarrier spacing, an oversampling rate, and a transmitting pulse shaping filter class;
        detect the information of the pulse shaping scheme from the radio resource; and
        demodulate the signal waveform from the radio resource by using the detected information of the pulse shaping scheme comprising the pulse shaping parameters.

13. The radio receiver device of claim 12, wherein the information of the pulse shaping scheme is uniquely mapped as a time-frequency-sequence pattern denoting one of a plurality of different pulse shaping scheme configurations.

14. The radio receiver device of claim 13, wherein the processor is configured to:
    detect the information of the pulse shaping scheme based on the time-frequency-sequence pattern.

15. A method of transmitting a pulse shaping scheme, the method comprising:
    modulating a data frame onto a radio resource based on a transmission waveform, wherein the transmission waveform is formed according to a pulse shaping scheme, and the pulse shaping scheme comprises that a plurality of pulse shaping parameters are dynamically varied, and the plurality of pulse shaping parameters comprises a subcarrier spacing, an oversampling rate and a transmitting pulse shaping filter class;
    allocating a section of the radio resource for carrying information of the pulse shaping scheme, wherein the information of the pulse shaping scheme comprises information of a currently used subcarrier spacing, a currently used oversampling rate, and a currently used transmitting pulse shaping filter class; and
    transmitting a signal waveform according to the pulse shaping scheme over the radio resource, wherein the signal waveform comprises the information of the pulse shaping scheme within the allocated section of the radio resource.

16. The method according to claim 15, wherein the section carrying the pulse shaping scheme is allocated in a changeable part of the radio resource.

17. The method according to claim 15, wherein the section of the radio resource for carrying information of the pulse shaping scheme is allocated based on the pulse shaping scheme.

18. The method according to claim 15, wherein the information of the pulse shaping scheme is uniquely mapped onto the radio resource as a time-frequency-sequence pattern denoting one of a plurality of different pulse shaping scheme configurations.

19. The method according to claim 18, wherein each of the plurality of pulse shaping configurations comprises a specific signal sequence, a specific subcarrier index and a specific starting time of the time-frequency pattern.

* * * * *